United States Patent [19]

Sukun

[11] Patent Number: 5,858,234

[45] Date of Patent: *Jan. 12, 1999

[54] SUCTION STRAINER FOR USE WITH A CENTRIFUGAL PUMP

[76] Inventor: Nami K. Sukun, 2711 Quail Creek, Missouri City, Tex. 77459

[ * ] Notice: This patent issued on a continued prosecution application filed under 37 CFR 1.53(d), and is subject to the twenty year patent term provisions of 35 U.S.C. 154(a)(2).

[21] Appl. No.: 491,677

[22] Filed: Jun. 19, 1995

[51] Int. Cl.$^6$ .............................. B01D 35/02; B01D 35/28
[52] U.S. Cl. ...................... 210/460; 210/416.1; 210/170; 137/140
[58] Field of Search .............................. 210/416.1, 416.2, 210/416.3, 416.4, 416.5, 449, 460, 170, 461–463, 232; 137/140

[56] References Cited

U.S. PATENT DOCUMENTS

| | | | |
|---|---|---|---|
| 1,509,305 | 9/1924 | Mahon | 210/460 |
| 1,694,743 | 12/1928 | Hinman | 210/460 |
| 1,694,770 | 12/1928 | Cram | 210/460 |
| 1,706,160 | 3/1929 | Hinman | 210/460 |
| 2,063,743 | 12/1936 | Kamrath | 210/460 |
| 2,084,587 | 6/1937 | McFarlin | 210/460 |
| 3,163,229 | 12/1964 | Salisbury | 210/460 |
| 3,817,390 | 6/1974 | Maruniak et al. | 210/460 |
| 4,717,477 | 1/1988 | Nagashima | 210/460 |

*Primary Examiner*—Cynthia L. Nessler
*Attorney, Agent, or Firm*—Madan & Morris, PLLC

[57] ABSTRACT

A two piece suction strainer for use with a centrifugal pump is provided. The strainer includes a cage having the form of a basket and a cover having an integral hub formed as a hose shank fitting. The cover is securely placed in the open end of the cage basket. The hose is directly attached onto the hub. The cage and the cover preferably are injection molded from a high impact plastic.

1 Claim, 3 Drawing Sheets

SUCTION STRAINER FOR USE WITH A CENTRIFUGAL PUMP

BACKGROUND OF THE INVENTION

1. Field of the Invention

The present invention relates to straining and filtering devices, and more particularly to a suction strainer for use with a centrifugal pump for pumping a fluid from a source to another location.

2. Background of the Invention

Centrifugal pumps are widely used for pumping fluids, such as environmental water, from a body of fluid (source) at one location to another location for a variety of purposes including irrigation of crops, flood control, land drainage, etc. Typically, a suction hose is positioned in a body of water with the strainer connected to the hose end. The strainer permits water to pass therethrough with very little resistance but inhibits the passage of debris greater than a desired size. Such debris can restrict or block the fluid line reducing pumping performance and potentially leading to pump seizure and/or damage.

In the prior art, suction strainers generally comprise a basket-shaped cage having an open end and a threaded connection at the other end for connecting thereto a hose fitting. A removable cover is securely placed on the open end. The cage and the cover have openings or passages which allow the fluid to flow into the cage. To use the strainer, a hose fitting having threads at its one end that compliment the threads in the cage is screwed into the cage. One end of the hose is connected to the second end of the hose fitting while the other end of the hose is fitted onto the centrifugal pump. To transfer fluid from a source to another location, the strainer is placed in the body of fluid and the pump is operated. The fluid enters the strainer and is passed into the hose and thus the pump. The openings in the cage and the cover prevent debris of sizes greater than the openings from entering the strainer and thus the pump.

Various hose sizes are used for different applications. To provide strainers for different hose sizes, the strainer manufacturers make a separate cage having a threaded hose fitting connection for each hose size. Hose diameters vary in size depending upon the pump size and the hose used. Hoses are generally available from sizes smaller than one inch in diameter to greater than four inches. The cages and the covers are typically injection-molded parts. Thus, the strainer manufacturers make a separate cage mold having a threaded connection therein for each hose size. The manufacturers and distributors also must inventory a strainer and a separate hose fitting for each hose size.

Applicant has noticed significant drawbacks in such prior art strainer design: specifically, the use of a threaded connection for attachment of the hose fitting and the use of a separate hose fitting. The use of a threaded connector increases the cost of building the injection molds and the cost of manufacturing the cage due to increased molding discontinuities at the threaded end. In addition, such prior art strainers consist of three separate parts which must be made and inventoried. Clearly, a strainer design which has fewer parts and which is less expensive to make by eliminating the threaded connector would be economical and, thus, desirable.

The present invention addresses the above-noted problems and provides a strainer having two parts: a cage that may be used with multiple hose sizes and a cover that has a hose connection thereon.

SUMMARY OF THE INVENTION

The present invention has a design which makes the hose fitting integrally molded to the cover and a cage that may be used with multiple covers. The hose is connected to the cage cover. In such a manner, the required manufacturing molds are reduced in number, simplified and, thus, made less expensive to make or obtain since the use of a threaded connection is eliminated. At the same time, inventoried parts are reduced in number and the ease of strainer installation is enhanced. Further, the strainer cover is easier to attach and remove for maintenance purposes since the integrally formed hose fitting can be used as a handle.

As one embodiment, the present invention comprises a suction strainer for use with a centrifugal pump. The strainer includes a substantially rigid cage having a closed end and an open end having an interior surface thereof. A plurality of ribs define a seat at an outer edge of a band and a gap between successive ribs. A cover comprises a hub having the form of a hose shank connector supported by a plurality of radially disposed spokes. The spokes extend outward from the hub and terminate at a ring received in the seat. A tooth is formed in some spokes for engaging an inner edge of the band between gaps in the ribs for removably securing the cover in the seat. The strainer is preferably made of a high impact injection molded plastic. The cage preferably has a basket shape. The diameter of the hub can vary depending on the required hose size.

As another embodiment, the present invention comprises a method for making a suction strainer. The method includes the steps of: (a) injection-molding a unitary cage having a an open end and a closed end, said open end having a circumference which is greater than the circumference of the closed end, said cage further having a plurality of openings therein for allowing passage of a fluid therethrough; (b) injection-molding a unitary cover having a hub thereon, said cover having an outside dimension suitable for placement in the open end of the cage; and (c) securely placing the cover on the open end of the cage to form the suction strainer.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENTS

Figure 1:
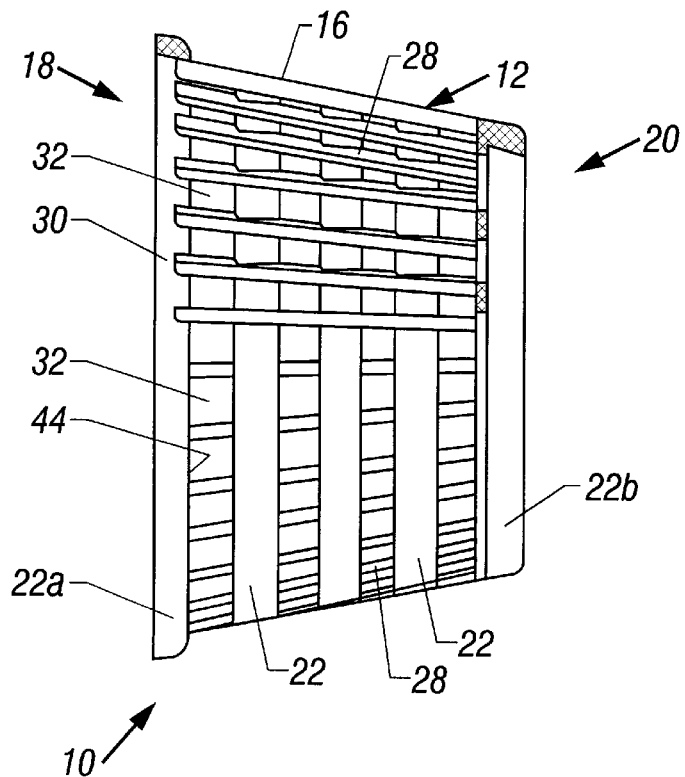
FIG. 1 shows a partially cut-away side view of a strainer cage or basket of the present invention.
Figure 2:
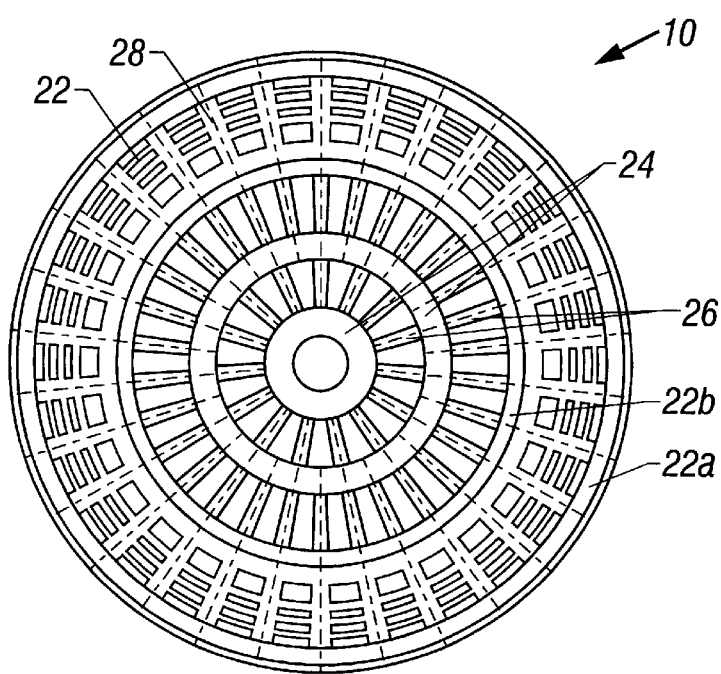
FIG. 2 shows an end view of the strainer cage of FIG. 1 from the closed end.
Figure 3:
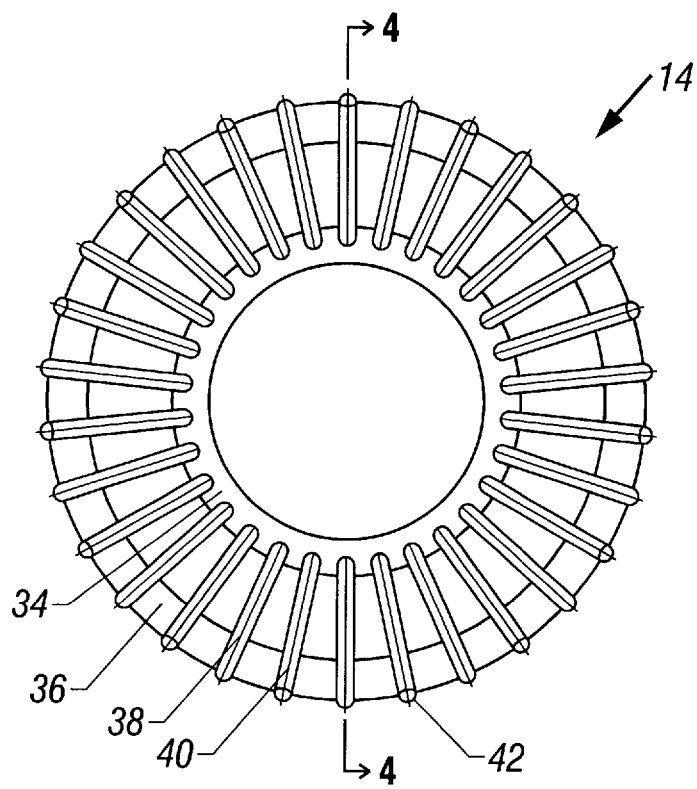
FIG. 3 shows the top view of the strainer cover of the present invention.
Figure 4:
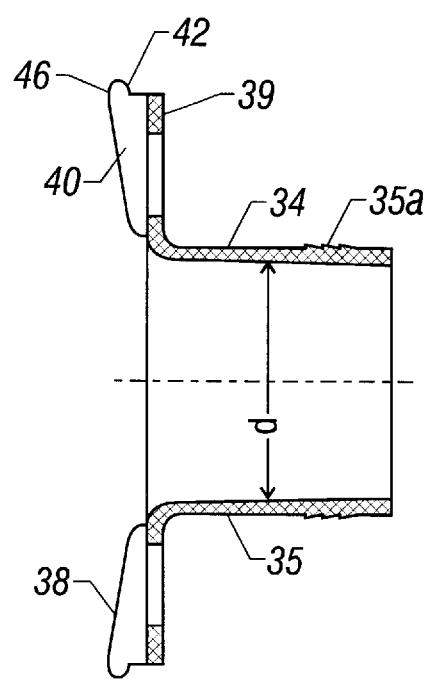
FIG. 4 shows a cross-sectional side view of the cover of FIG. 3 along the lines 4—4 in FIG. 3.

Referring to FIGS. 1–4, a strainer 10 of the present invention useful for inhibiting the passage of debris into the intake of a centrifugal pump comprises a cage 12 and a cover 14. The cage 12 having the shape of a basket comprises a generally cylindrically shaped body 16 having an open end 18 and a closed end 20.

The body 16 is preferably formed of a plurality of concentrically aligned bands 22 spaced along the axis of the cage with an outer band 22a defining the open end 18 and a bottom band 22b at the closed end 20. The closed end 20 is formed of rings 24 concentric with the bottom band 22b and connected by a plurality of spokes 26.

The bands 22, 22a, and 22b are connected by a plurality of interiorly depending ribs 28 extending from the closed end 20 up to the open end 18 except for a short distance therefrom that defines a seat 30 for the cover 14. The ribs 28 are spaced apart radially in a preferably even distribution and define gaps or passages 32 therebetween. In a preferred embodiment, there is one rib 28 per 8 to 12 degrees of rotation.

The cover 14 preferably is a unitary piece having a hub 34 with an inside diameter generally denoted herein as "d" and an outer surface 35 adapted to receive a hose having an inner diameter that will fit on the outer surface 35. The outer surface preferably has ribs 35a for grasping the hose placed on the outer surface 35. The hub terminates into a substantially flat portion 39 having a plurality of radial spokes 38 extending away form the hub 34 and terminating into an outer ring 36.

Some of the spokes 38 comprise locking member 40 for engaging the strainer body 16 for attaching the cover 14 to the cage 16. The spokes 38 depend into the interior of the cage 16 when the cover 14 is attached to the open end 18 of the cage 10. The locking spokes 40 are preferably evenly distributed around the circumference of the cover 14 and depend inside the strainer 10. When the cover 14 is received in the seat 30, the spokes 38 and 40 are received in the gaps 32 between ribs 28 of the cage 10.

The locking spokes 40 have a tooth 42 at an end thereof for engaging a locking edge 44 of the outer ring 22a. Each tooth 42 has a dimension slightly larger than the inside diameter of the outer band 22a so that the teeth 42 abut the edge 44 in a locking manner when the cover 14 is positioned in the seat 30. The teeth 42 preferably have rounded outer edge for sliding against the band inside surface 46 for ease of attaching the cover 14.

To close the strainer 10, the cover 14 is aligned with the cage open end 18 and the teeth slidably engaging the band inside surface. A relatively sharp force is then applied to the hub 34 to drive the teeth 42 into locking position abutting the locking edge 44, an oblique force can be applied to the cover 14 at the hub 34 while grasping the cage 12 to remove the cover from the cage.

The cage 12 and cover 14 are preferably made from a resilient, high impact injection molded plastic material that has sufficient resilience for attaching the cover to the cage 12 yet sufficiently strong to hold up under underwater pumping conditions.

Figure 7:
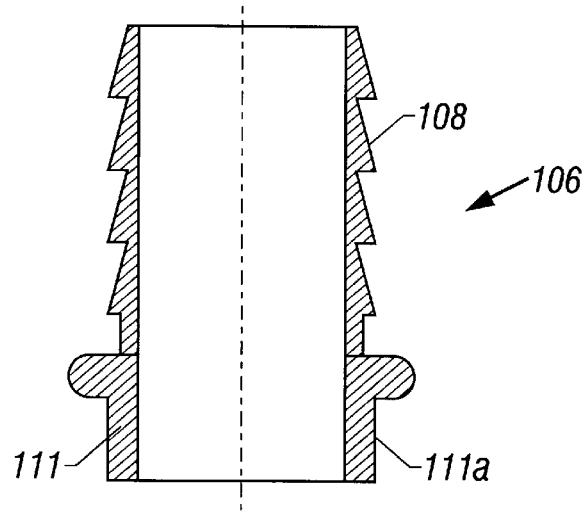
FIG. 7 (prior art) shows a sectional side view of a hose coupling for attachment to the threaded connection of the strainer cage of FIG. 5.
Figure 5:
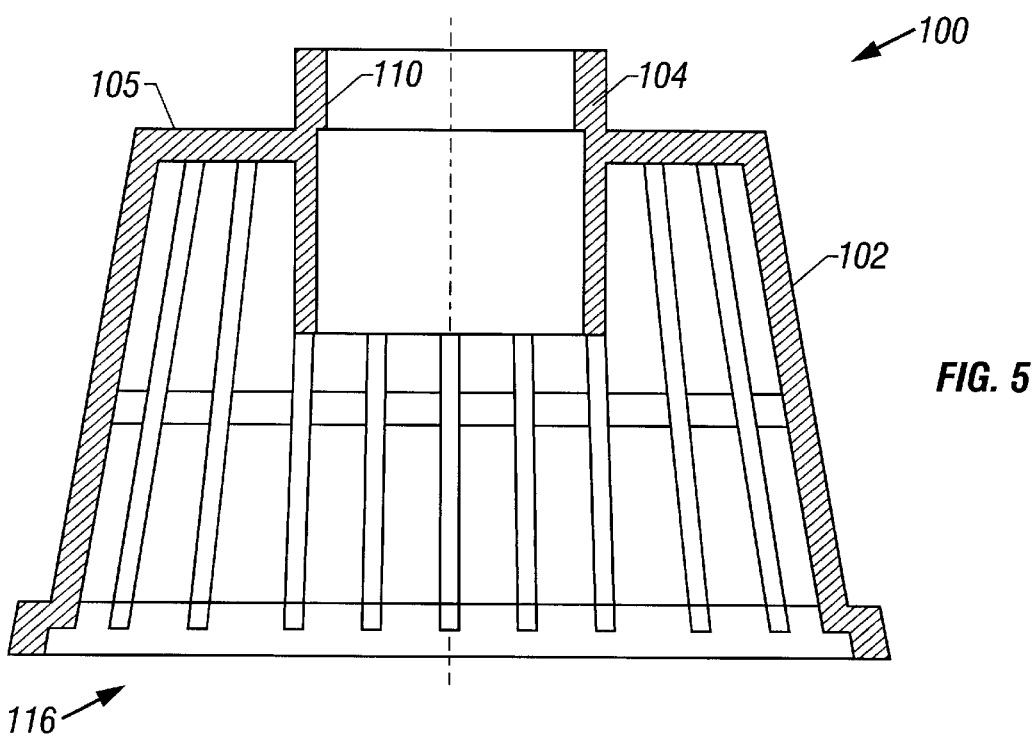
FIG. 5 (prior art) shows a side view of a strainer cage having a threaded connection at the top end.
Figure 6:
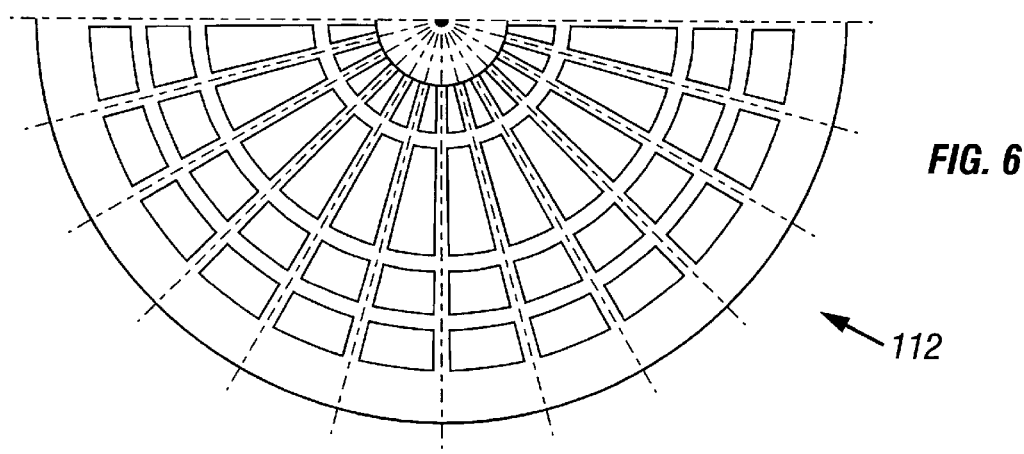
FIG. 6 (prior art) shows a one-half side view of the strainer Cover for use with the strainer cage of FIG. 5.

Referring to FIGS. 5–7, the prior art strainer 100 includes a unitary cage 102 having an open end 116 and a cylindrical connector 104 having threads 110 along its inside at an end 105 opposite the open end 116. The outer diameter of the open end 116 is made greater than the diameter of the threaded connector end 105 so that the cage 100 may be injection molded. A cover 112 is securely placed in the open end 116 to close the cage 102 substantially in the same manner as described above in reference to the present invention. To attach a hose to the strainer, a commercially available hollow coupling 106 is used to connect the cage 100 to the hose (not shown). The coupling 106 contains a nipple 111 having threads 111a at its outside that may be screwed into the threads 110 in the cage 102 and a hose end 108 designed to accept a hose thereon of a desired size. Such prior art strainers require a separate cage for each hose size and, thus, a separate injection mold thereof. Injection molds for a cage having a threaded end are relatively expensive to make. Further, the strainer manufacturers and the distributors must inventory a separate cage and hose connector for each hose size.

As discussed earlier, the strainer according to the present invention has two parts, i.e., a cage that may be used with multiple hose sizes and a cover having a hose connection thereon. The cost to make molds for the strainer according to the present invention is substantially less compared to the above-described prior art strainers due to the fact that lesser total number of molds are required and that no threads are used. Further, the cost of manufacturing piece parts is less compared to the above-described prior art strainers due to simpler design.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A suction strainer for centrifugal pump, comprising:
   (a) a substantially rigid cage having an open end and a closed end, the open end having an outer band supported by a plurality of radially spaced ribs attached to an interior surface thereof, and defining a seat at an outer edge of the band and a gap between successive ribs; and
   (b) a cover comprising a hub having an outer diameter connected to a hose having an inner diameter wherein said inner diameter of the hose is greater than said outer diameter of the hub, the hub having an outer surface with ribs formed thereon for grasping the hose thereon, said hub supported by a plurality of radially disposed spokes extending outward from the hub and terminating at a ring received in the seat, and a tooth formed on at least a portion of the spokes at ends thereof, each toothed spoke having a diameter greater than the inside diameter of the cage for engaging an inner edge of the band between gaps in the ribs for removably locking the cover in the seat.

* * * * *